Feb. 17, 1970  E. M. MEYER  3,495,337
AUDIO RECORD TEACHING SYSTEM
Filed Oct. 18, 1965  3 Sheets-Sheet 1
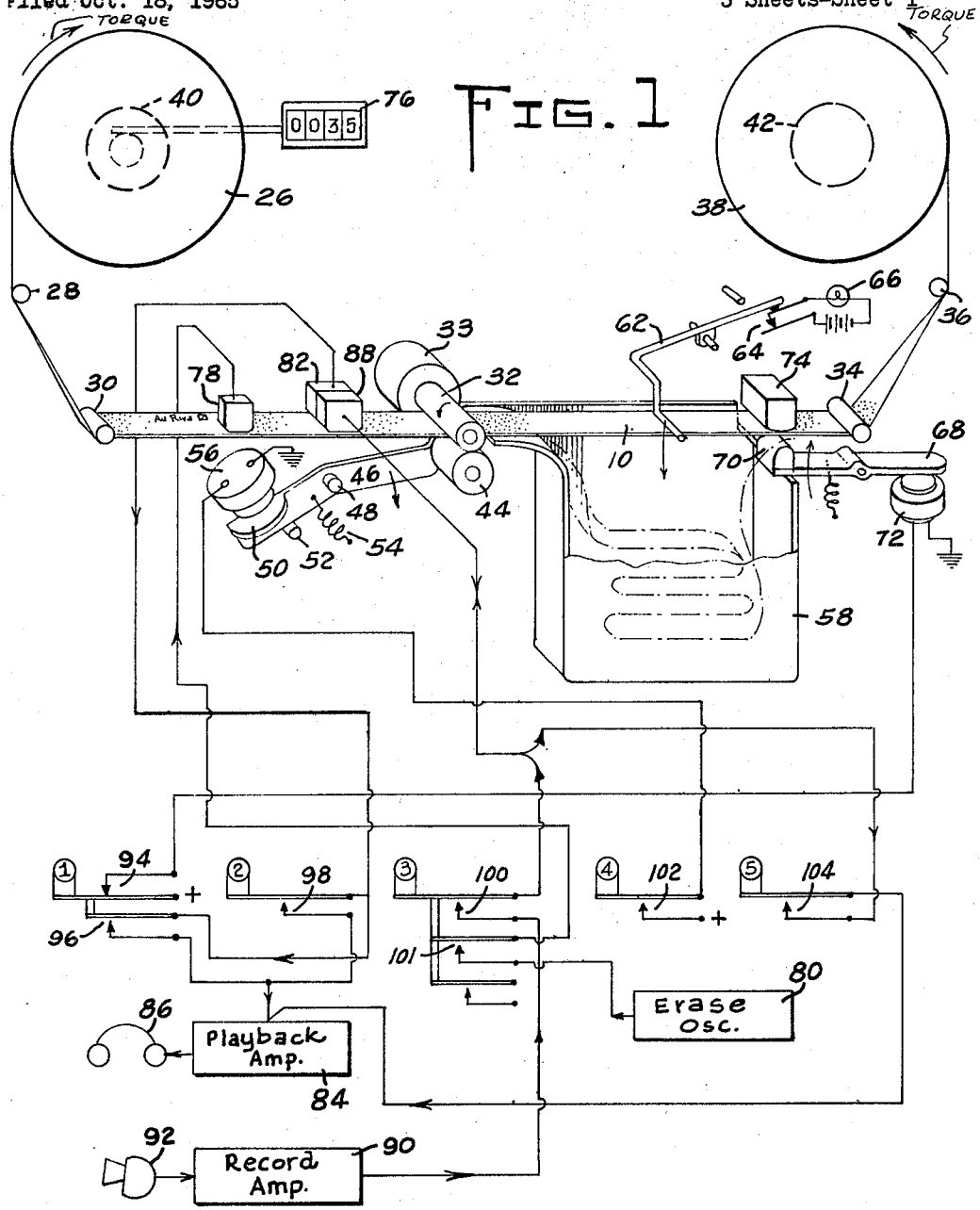
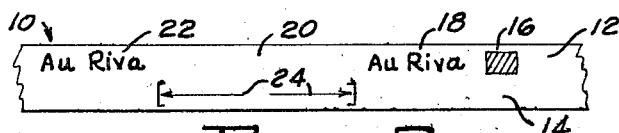
INVENTOR:
EDWARD M. MEYER,
BY
ATTORNEY Feb. 17, 1970     E. M. MEYER     3,495,337
AUDIO RECORD TEACHING SYSTEM
Filed Oct. 18, 1965     3 Sheets-Sheet 2
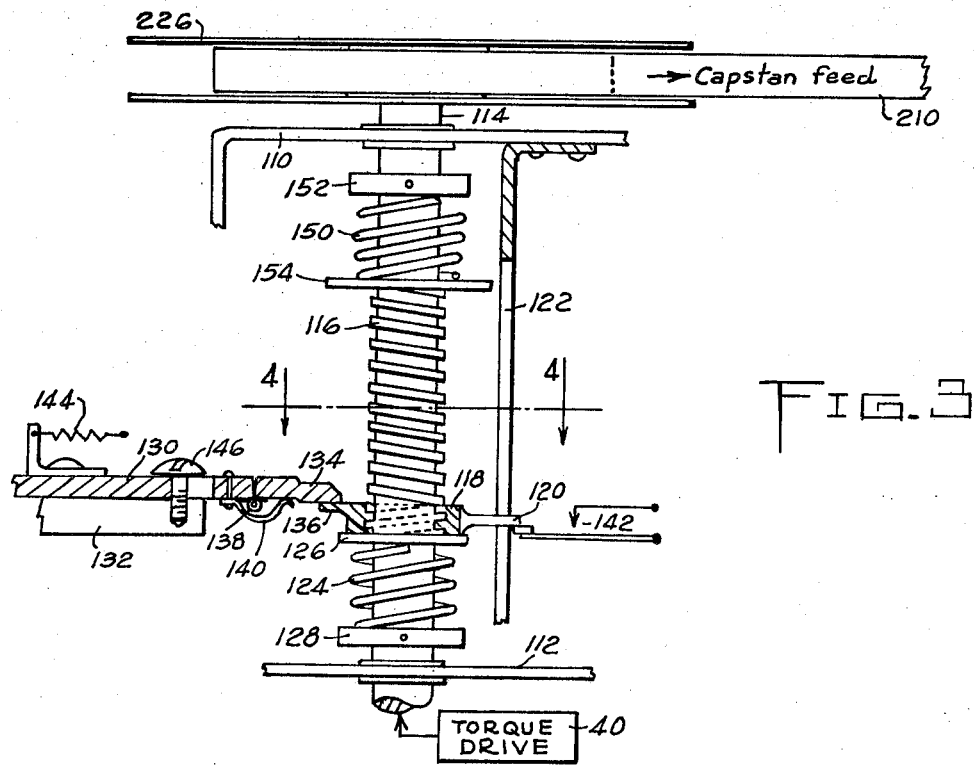
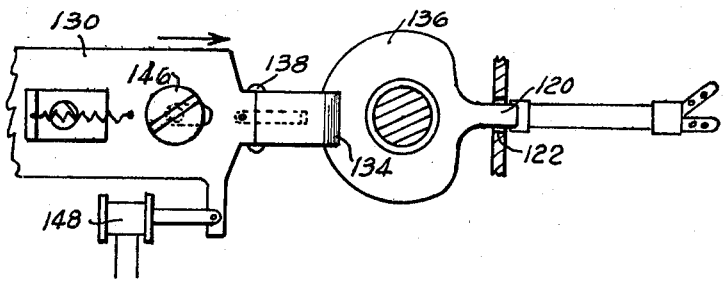
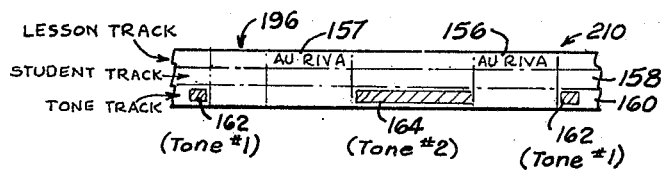
INVENTOR:
EDWARD M. MEYER
BY Walter J. Kreske
ATTORNEY Feb. 17, 1970  E. M. MEYER  3,495,337
AUDIO RECORD TEACHING SYSTEM
Filed Oct. 18, 1965  3 Sheets-Sheet 3

INVENTOR:
EDWARD M. MEYER,

BY Walter J. Kreske
ATTORNEY

United States Patent Office 3,495,337
Patented Feb. 17, 1970

3,495,337
AUDIO RECORD TEACHING SYSTEM
Edward M. Meyer, Bethesda, Md., assignor to General Electronic Laboratories, Inc., Boston, Mass., a corporation of Delaware
Filed Oct. 18, 1965, Ser. No. 497,304
Int. Cl. G09b 5/04; G11b 15/32, 5/00
U.S. Cl. 35—35                                   5 Claims

ABSTRACT OF THE DISCLOSURE

A reel to reel snap back recording and reproducing machine for teaching purposes includes oppositely driven supply and take up reels and recording, reproducing and erase heads disposed along the path between the supply and take up reels. An electromagnetically controlled brake prevents take up of tape by the take up reel and an electromagnetically controlled capstan pulls tape past the recording, reproducing and erase head. With the brake engaged tape may be fed by the capstan and then snapped back on release of the capstan. A tautness sensor signals completion of the snap back operation.

---

This invention pertains to teaching apparatus and methods, and in particular to improvements in the aural (audio voice) teaching of languages and other subjects which can be taught by the transmission to the student of words, sentences, sounds and the like whose content the student is then to repeat for review and comparison purposes.

One of the most effective systems for the teaching of subjects such as noted above has proved to be the exposure of the student to a correct rendition of words (or other components of a subject) which the student then parrots by his own vocalization, which is recorded and very quickly repeated to the student. Differences between the correct rendition, and that generated by the student, are thus immediately available to him, providing automatic "reinforcement" (in the psychological meaning of the term) or "punishment" (in the same context) accordingly as the differences are slight or great. It has also been found that, after the student's own review and appraisal of his effort, it is helpful for the student to hear, again, the correct or proper rendition of the material. Such systems are difficult to implement by the use of convenient and economical magnetic sound tape recording equipment, even when tapes having two or more sound tracks are provided. A lesson tape for such a system may include one track carrying spaced recordings of the teacher's "correct" rendition of the matter being studied, suitably separated to allow time for the student to record, on a second track, his own effort. As is obvious, the re-play of the student's own recording requires a reproducing head or transducer positioned in a following position, vis-a-vis the tape play direction, and the separation of the student's reproducing head from his recording head severely constrains the time available for his practice effort. Also, time cannot be provided for a second or third trial on the student's part before he is required to undertake the replication of a new selection from the instructional recording.

In my prior U.S. Patent No. 3,155,778, I disclosed and claimed a teaching system of this general kind in which the tape bearing the student's own voice effort was fed into a side-tracked loop (rather than directly under a reproducing head) to allow a number of practices, or a practice session of arbitrary length, to be accomplished before reproduction of the student's voice was commenced. This allowed a variable time of student practice before any reproduction of his effort (i.e., the student could attempt one or more pronunciations, followed by reproduction of all of them before a new instruction was given him), but it is psychologically desirable for the student to be able to hear each separate effort before he essays a further repetition of the material.

The present invention accomplishes the desired result by a novel arrangement of sound tape recording and reproducing apparatus, and control circuitry therefor. Basically, the invention provides a single-deck (and hence reasonably economical) sound machine which provides for the selective feeding of tape as desired in the ordinary direction of tape feed, and also provides for a high-speed reverse feed of said tape, which allows the student to repeat the original instruction as many times as desired, followed in each instance by a trial or trials of his imitative effort, and with each of his own efforts being immediately reproduced, if desired. Accordingly, the student is entirely freed from the necessity to "pace" or keep up with the rate of delivery of instructional material, but can adjust said rate from selection to selection in accordance with its difficulty for him as an individual. Following completion of the student's efforts and listening periods for those efforts, the record tape repeats, as usual, the correct rendition of the material. At that point under the system of the invention, the student can make a final appraisal of his progress, and if he is dissatisfied, he can readily return the tape quickly to a point from which the entire sequence may be repeated from the beginnig.

The present system may therefore be characterized as a reel-to-reel snap-back recording and reproducing machine, the term snap-back here signifying an entirely different operation from the mere reversal of direction of tape feed as between two reels. The system provides for metering of the amount of tape that is to be passed backwards to return to a particular earlier portion thereof, so that no time is lost (nor is the student's attention diverted) in the proper manipulation of the machine. The teaching efficiency of the system is therefor high, and the equipment simplicity does not impose any serious limitation upon its wide utilization.

The invention will now be described in connection with certain preferred embodiments of the apparatus employed, and the operational steps that are followed, it being understood that a variety of modifications can be used in accordance with the underlying principles of the new approach to the problem.

In the drawings,

FIG. 1 is a schematic illustration of a preferred combination of sound recording and reproducing equipment for carrying out the invention, combined with a circuit diagram, partly in block form, of the control circuits for operating in the desired manner.

FIG. 2 is a face view of a typical section of an instruction tape as employed in the FIG. 1 apparatus, with printed words substituted, for clarity of understanding, in place of the sound track records thereof which would not be visible or comprehensible from a true picture of the tape section.

FIG. 3 is an enlarged elevation of a modified portion of apparatus similar to FIG. 1, with parts in section.

FIG. 4 is a sectional view taken on line 4—4 of FIG. 3.

FIG. 5 is a view of a portion of a modified magnetic tape used with the modified apparatus.

Figure 6:
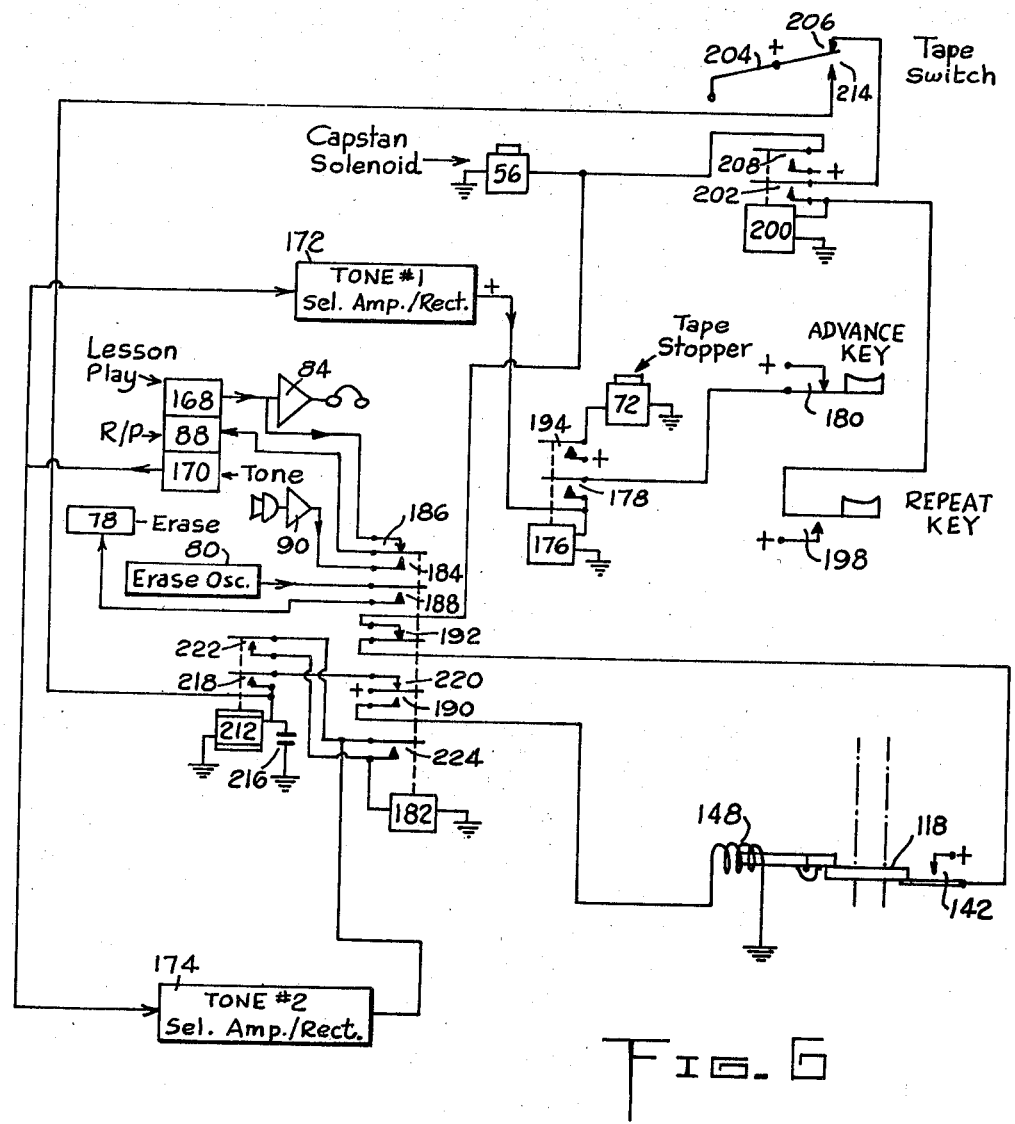
FIG. 6 is a schematic diagram of the control portions of the modification.

A typical instructional magnetic sound tape is shown in both FIGS. 1 and 2 of the drawings, and is given the general reference numeral 10. As most clearly shown in FIG. 2, a typical section of the tape carries magnetic recording material constituting two half-width "tracks"

12 and 14. The upper track 12 in FIG. 2 is the "correct" or instructional track, and this track lies farthest from the viewer in the perspective portion of FIG. 1. As an example, the leading portion of the section shown in FIG. 2 (which leading portion is at the right end for a normal playing direction of tape motion from left to right), carries in the upper track a short audio signal, buzz or the like recorded as at spot 16. Immediately following this signal, the magnetic modulations for the phrase "Au Riva" are impressed on the track as at 18, followed by an unrecorded space 20, and this in turn is followed by a correct repetition of the phrase "Au Riva" as at 22.

The lower track 14 is devoted to the student's recordings, and may be erased for re-use as desired; normally, the upper track is permanently unerased, so that an instructional tape is a relatively permanent portion of a library of such tapes and can be used successively by many different students. This lower track 14 will contain in the region denoted by the arrows 24, the record made by the student of his mimicry of the phrase "Au Riva" after it has been played to him from portion 18 of the upper track. However, as will appear, the student's track even beyond the second recording at 22 is available for repeated efforts, as the entire tape can be rapidly rewound to bring portion 18 back under the magnetic sensing head when desired.

Returning now to FIGURE 1 of the drawings, the tape 10 passes from a storage reel 26, around guiding idlers 28 and 30, past a constantly-rotating drive capstan 32 (driven by motor 33) operating at record-reproduce speed, and thence via idlers 34 and 36, to a storage reel 38. Reels 26 and 38 are carried by respective shafts which are connected to respective torque motors 40 and 42, which tend to drive the reels in the directions indicated by the "torque" arrows beside them in the drawing. With the tape out of contact with drive capstan 32 (the tape's normal path brings it just out of contact with the capstan), the torques that are applied to the reels are balanced, within the tolerance range represented by the unavoidable friction in the apparatus. However, both torque levels are such that, in the absence of the opposite torque, the tape will rapidly be wound in the corresponding direction; i.e., at a speed much higher than that due to capstan 32 when the latter engages the tape. On the other hand, the tape driving effort due to capstan 32, when the tape is urged against it by the movable pressure roll 44, is entirely adequate to overcome the torque of either of reels 26 and 32, and to feed the tape at its proper speed for recording and reproducing. That is, the capstan when engaged with the tape will pull tape from reel 26, and reel 38 will not over-drive the tape being fed by the capstan.

As an example of a typical kind of torque drive that is satisfactory for the reels, each may be provided with a constantly running motor coupled to the reel shaft through a slipping clutch, or both reels may be driven from a single constantly running motor through suitable slipping belts or clutches that drive respective pulleys secured to the reel shafts. Alternatively, the motors 40 and 42 may be torque motors of the type which are merely stalled, without damage or overheating, when their drive efforts restrained.

In order to control the feeding of tape in the "forward" direction (to the right in FIG. 1) by capstan 32, the pressure roll 44 is mounted for free rotation at one end of a lever arm 46 pivoted to the machine frame at 48, the other end of the arm forming an armature 50 urged against a stop 52 by spring 54. A solenoid magnet 56 is positioned to attract the armature when the magnet coil is energized, rotating arm 46 clockwise against the spring tension, and thus moving the pressure roller 44 away from the tape at capstan 32, as indicated by the arrow on lever 46.

A tape bin or storage receiver 58 for loose tape is provided just to the right of capstan 32, and so positioned that if tape is fed by the capstan, and is not taken up by reel 38, it will fall proceed into the bin, as indicated by the looped chain lines therein. On the other hand, if reel 38 is allowed to pull the loose tape out of the bin, it will ultimately restore the tape to the taut condition shown in full lines in FIG. 1, even if capstan 32 continues to feed more tape in the right-hand direction. In other words, as has already been indicated, the tape reels can pull tape at a much higher linear speed than can the capstan 32. Whenever the tape is taut across the top of the bin (that is, when the bin is empty), a sensitive feeler arm 62 is raised sufficiently to close the contacts 64 in the circuit of an indicator lamp 66, for a purpose to be described below.

The control of the passage out of bin 58 of any tape temporarily stored therein is accomplished by a frictional tape stopper or brake which is positioned just at the exit end lip of the bin. This stopper comprises a pivoted arm 68 having at its left and a relatively soft brake element such as a rubber friction pad 70. When the arm is swung clockwise by a solenoid magnet 72, this friction element presses the tape against a similar fixed braking element 74 on the machine frame, gripping the tape and holding it stationary at this point regardless of the torques of either of the storage reels. It is obvious that if the brake is engaged to hold the tape, any tape fed by capstan 32 must fall into the bin, and if the brake is held engaged when the pressure roller 44 is released, all of the loose tape will be rapidly fed backwards onto reel 26 by motor 40, and when the tape becomes taut (with all slack tape removed from bin 58) the tape motion will stop and lamp 66 will light up to signal this fact to the user. On the other hand, if the stopper magnet 72 is de-energized to release the brake, reel 38 will rapidly wind up all of the loose tape from the bin (under the drive of torque motor 42), giving the same lamp signal when the tape has become taut again. Whether reel 38 continues to pull tape will then depend upon whether pressure roll 44 is being pressed against the tape or not at the time.

A reel revolutions indicator 76 is connected to the shaft of reel 26, so that the operator can readily return the tape to any point at which he may have observed the reading of the counter; for example, to the beginning of a particular lesson portion of the tape. A conventional erasing head 78 for the student's track half only is provided, energized through a control circuit from a conventional erase oscillator 80. A reproducing head 82 for the prerecorded lesson track (instructional track) 12 ultimately operates through a playback amplifier 84 to energize headphones 86 worn by the student (or a loudspeaker), and a conventional record/reproduce head 88, stacked with head 82, is in the proper aligned condition with reference to the student's track 14. The head 88 is, under circuit control, supplied with recording signals via the recording amplifier 90 from a microphone 92 at the student's position. When the circuit connections call for playback of material from the student track 14, head 88 conveys the tape signals to the same reproducing (playback) amplifier 84 as was employed with the instructional track.

For the purpose of disclosing the invention in one of its simpler versions (in the interests of clear understanding of the sequence), student control by a series of five pushbuttons has been provided.

It is assumed that at the commencement of operations, the tape will be in a position with a signal record patch 16 corresponding to the next lesson somewhere in advance of the position of playback head 82. Prior to operation of pushbutton 1, the stopper solenoid 72 is held energized by the normally-closed contacts 94 of pushbutton switch 1, so that any tape flowing from the capstan drive will pass into the bin 58.

The student first depresses pushbutton 1, which de-energizes the stopper solenoid 72 at contacts 94, allowing all tape in the bin to be rapidly wound onto reel 38. Tape will feed beneath playback head 82, since solenoid 56 is not energized, and when the next signal record 16 reaches that head, the student is thereby signalled to release pushbutton 1. The signal tone is conveyed to headphones 86 from playback head 82 over closed contacts 96. When the student releases pushbutton 1, stopper solenoid 72 is again energized over contacts 94, and the tape flowing under the heads goes into the bin 58.

The student immediately depresses pushbutton 2, closing contacts 98 and allowing him to hear the "lesson" or phrase at 18 via playback head 82, amplifier 84 and headphones 86. Tape continues to flow only into the bin 58.

After hearing the lesson phrase, the student releases button 2 and operates button 3, noting the reading of counter 76 (in this embodiment), and dictating the same phrase into his microphone 92. The circuit from the microphone amplifier 90 passes over now-closed contacts 100 to the record-reproduce head 88, and the track 14 of the tape is automatically cleaned by erase head 78, over contact 101, as it approaches the head 88. The student's effort is thus recorded on that track. The spacing between heads 78 and 88 is exaggerated in FIG. 1, for clarity; actually, they are positioned close together to avoid the possibility that any un-erased tape can reach the head 88 when button 3 is first operated.

The student now releases button 3 and depresses button 4, whose contacts 102 and the indicated circuit energize solenoid 56, allowing the torque on reel 26 to rewind tape out of the bin 58. The student may release button 4 when the counter 76 again indicates the reading he noted at the start of his dictation; if so, he immediately depresses button 5, whose contacts 104 close and allow him to hear his own effort via record-reproduce head 88 and amplifier 84, followed by confirmation at track portion 22. However, if he desires to hear the "lesson" at 18 again, in order to make another attempt to imitate it, he may ignore the counter reading and hold button 4 depressed until signal light 66 indicates that all of the tape has been rewound from bin 58 (the tape will come to a stop when this has occurred). He may then operate button 2 and will hear the lesson at 18 a second time, after which he can again operate button 3 to record his revised imitation of the lesson, and so on. A variety of other modes of operation will readily be accomplished if desired.

In order to make it unnecessary for the student to note the reading of counter 76 at the time he operates button 3 (which in the above described system he must do in order to be able to return the tape section bearing his dictation to a point at which he can cause its reproduction), the automatic system of FIGS. 3, 4, 5, and 6 has been provided. It operates by "memorizing" the length of tape used during the student's practice recording, so that it can automatically control the tape motion to bring it to the appropriate starting point when the student desires to hear his own effort.

FIGS. 3 and 4 illustrate the construction of a built-in metering device by which the rotations of the supply reel during the period when the student is making his own recording (replicating the stimulus which he has just heard), are registered, to allow automatic return of the tape to its position at the start of that recording, for playback purposes. This eliminates the need for the student to note a counter or the like at the commencement of his dictation. The metering device is shown in these figures as applied to the shaft of the supply reel, designated by numeral 226 in FIG. 3.

This partial sectional elevation of the supply reel and shaft shows the normal direction of tape feed as the tape 210 passes to the right in the same way as already described. The shaft 114 of the reel is supported in bearings in machine frame plates 110, 112, below the latter of which the shaft is connected to the torque drive 40 as described in connection with FIG. 1. An intermediate portion of this shaft 114 has the lead screw thread 116, with which is engageable the lead screw nut 118 to feed the latter upward (when it is allowed to engage the shaft thread) a distance proportional to the number of turns made by the shaft 114 and hence of reel 226. Rotation of the nut 118 is prevented by the positioning of a tail portion 120 thereof in a slot 122 in a bracket depending from frame element 110.

In the position shown in FIG. 3, the nut 118 is below its point of engagement by the lead screw thread, slightly compressing the coil spring 124 which lies between a loose washer 126 and a fixed collar 128 on the shaft 114. The nut is held down out of engagement with the lower end of the lead screw by a latch mechanism comprising a plate 130 slidable left and right on a fixed support 132, and is shown as moved to its right extremity where the pivoted tip 134 of the latch engages above the rim 136 of the nut. The pivot hinge 138 of this tip 134 is below the plane of the plate 130, so that the tip cannot swing up from the position shown, but can later swing down, against the restoring force of the spring 140, to clear the rim 136 when the nut later descends along the threaded portion 116.

Thus, in the position shown, the latch mechanism holds nut 118 beneath the point of engagement with the lead screw, regardless of the direction of rotation of shaft 114. When in this lower position, the tail portion 120 engages and opens a switch contact set 142 for a purpose to be described.

Slide plate 130 is urged to the position shown by a spring 144, the slide being guided by a screw 146 passing loosely through a slot in the slide plate. When the slide is retracted to the left, as by a solenoid 148 in FIG. 4, the spring 124 forces the nut onto the threaded portion 116, and the nut travels upward a distance proportional to the shaft rotation. If the nut should reach the top of the threaded portion, which corresponds to an amount of tape greater than that intended to be metered, it is allowed to run idly off the top end of the thread, compressing a relief spring 150 positioned between a fixed collar 152 of the shaft, and a loose washer 154 that normally rides on the upper end of the threaded portion. Regardless of how far up the nut should travel, it will return downwardly as shaft 114 again rotates in the direction opposite to the normal tape-feed direction, and when it again reaches the lowermost position, rim 136 having snapped over the tip 134 of the latch mechanism, tail 120 will open contacts 142 and again come to rest.

Such a mechanism provides all that is needed for automatic restoration of recorded tape to the position it occupied at the start of the recording, since solenoid 148 need only be energized at the start of the recording to allow the tape to be metered by the upward travel of the nut 118. Upon reversal of the tape direction, the nut will travel down, and signal its complete return to the starting condition by opening contacts 142. The tape will then be just where it was at the start of the recording.

In order to illustrate the operation of such a device in connection with a tape system as generally described earlier, reference is now made to FIG. 5 which shows a short section of a typical teaching tape having three separate tracks or channels. The upper track of this tape 210 carries, as before, recordings 156 and 157 of the "lesson" separated by sufficient space to accommodate, on the center section 158, a recording of the student's effort to mimic this lesson. In the third track section 160, a series of control tones are recorded (during preparation of the lesson tape), there being a first tone frequency control signal patch 162 at a position just in advance of each "lesson" or stimulus recording, and a second tone frequency control signal patch 164 extending for the length of the student-record space on the center track 158. These control signals will be referred to hereinafter as Tone #1 and Tone #2 respectively, for brevity.

FIG. 6 is a schematic diagram showing the arrangement of parts utilizing the components described above for a typical automated learning system, relays having for the most part taken over the functions of the push-button switches of FIG. 1. Parts which are identical with those already described have been given the same reference numerals, such as the capstan pressure roller control solenoid 56, the tape stopper solenoid magnet 72, the erase oscillator 80 and erasing head 78, and record-reproduce head 88 which now senses only the center track 158 of FIG. 5. The "lesson play" reproducing head 168 is now independent of the head 88 since the lesson material is now recorded on a separate track from the control tone signals, and the separate tone-signal sensing head is indicated at 170. The record and reproduce amplifiers are again denominated 90 and 84, and supply their signals to the heads (or derive them from the heads) by connections as indicated.

The tone sensing head 170 is connected to the inputs of a pair of tone signal amplifying and rectifying devices indicated by numerals 172 and 174, which feed relay control voltages in response to the arrival of the two different control signal patches at head 170. To facilitate threading a new tape through the machine, pressure roller (44 of FIG. 1) is mechanically held retracted by conventional means such as an on-off knob, not shown, which allows the roller to advance against the tape when turned to "On" position. Thereafter, the position of the pressure roller is controlled solely by spring 54 and solenoid magnet 56 during the playing of the installed reel of lesson tape.

After the machine has been threaded and turned on, there is no tape in bin 58, and the tight-tape sensing lever closes contacts 214 to energize a relay 212, which locks itself energized over its contacts 218 and normally-closed contacts 220 of a record relay 182. Lesson tape 210 advances, driven by engaged capstan 32 and pressure roller 44 until the tone head 177 receives the Tone #1 signal. This signal is amplified and rectified by the frequency-selective amplifier-rectifier 172 which applies an operating voltage to Tone #1 lock-up relay 176, locking this relay closed, over contacts 178, thereby energizing the stopper solenoid 72. Tape will thereafter flow into the storage bin. The stimulus 156 passes under, and is read by the playback head 168, and is heard by the student through amplifier 84 and the earphones. Note that both the heads 168 and 88 are connected to the playback amplifier in all modes of operation except during the recording portion of the cycle. The tape as described is blank in those areas where a conflict of signals could otherwise result from this simplification.

The student thus hears the stimulus 156 and immediately upon completion thereof he voices his response into the microphone. After the stimulus has passed, the tone track 160 contains the patch 164 of Tone #2, which now passes head 170 and is reproduced by amplifier/rectifier 174 whose output activates the "record" relay 182 through contacts 222 which are closed because relay 212 is still self-locked from the tight-tape condition existing at the start of the cycle. Relay contact 184 connects the "record" amplifier 90 to the R/P head 88, allowing the student's voice to be recorded in the second or student's track 158 for an interval that was predetermined by the length of control patch 164. Contacts 186 have disconnected head 88 from the playback amplifier 84. Contacts 188 connect the erase oscillator 80 to the erase head 78, thereby erasing the previous student's recording, if there was one on the tape.

Contacts 190 energize the slide solenoid 148, removing the sliding latch to the left (FIGS. 3 and 4) and allowing nut 118 to engage the screw thread (pressurized by spring 124), causing the nut, in effect, to count the number of shaft turns during which the student is recording. Contacts 142 close as soon as the nut rides up, putting a positive voltage to contacts 192, which are now open. Upon completion of the record Tone #2 at patch 164, record relay 182 releases and contacts 192 close, thereby energizing the solenoid 56 and disengaging the pressure roller 44. Tape will then rapidly pass backwards out of the storage bin onto reel 226, and continue to do so until nut 118 is returned by the opposite rotation of reel 226 back down over the hinged end 134 of the slide mechanism to the non-threaded lower part of the shaft, thereby opening contacts 142 and causing the pressure roller solenoid 56 to release, allowing the pressure roller 44 to re-engage, driving the tape 210 once again past the heads and into the tape bin. Slide solenoid 148 releases when record relay 182 opens contacts 190.

The tape 210, with the student's voice recorded on channel 58 now passes under head 88 and the signal is fed through closed contacts 186 to the playback amplifier 84, and the student hears his own recorded voice.

The tape continues to flow under the heads and the confirmation signal (at 157 on the tape) passes the head 168, through the playback amplifier 84 and the earphones, and the student also hears the confirmation.

At this point the student must decide whether he wishes to advance to the next lesson stimulus, or repeat the previous effort. If he decides to advance, he momentarily operates the Advance key, opening contacts 180 which removes the plus voltage from the locking contacts 178, releasing lock-up relay 176 which in turn opens contacts 194, de-energizing stopper solenoid 72 and releasing the stopper 70 (FIG. 1) so that any tape in the bin 58 rapidly passes out, pulled by reel 38 until the tape becomes taut. In the meantime, tape continues to flow and after the short blank space 196 (of FIG. 5) has passed, another Tone #2 patch passes the tape head 170 and starts the cycle once again with a new stimulus. Blank space 196 is provided to allow time for the student to make the decision as between "Advance" and "Repeat."

If the student decides to repeat the previous lesson, he momentarily depresses the "Repeat" key, closing contacts 198, which feeds plus voltage to the relay 200, causing it to lock up because relay contacts 202 are now closed. This connects the relay to the microswitch attached to the arm 204 of the tape sensing device at the storage bin. Arm 204 is down (at its counter-clockwise limit) because the tape is loose inside the bin. The contacts 206 are thus closed when the tape is loose, thereby allowing relay 200 to lock up. Contacts 208 of relay 200 close, causing the solenoid 56 to disengage the pressure roller 44, which allows tape 210 to pass rapidly backwards out of the bin, being pulled by reel 226.

As soon as all of the tape has been pulled out of the bin, the arm 204 is pulled up (rotated clockwise) by the tape 210, which is stretched taut between the torque of reel 226 and the resistance of the engaged stopper. This arm 204 thus causes the contacts 206 to open, thereby removing the lock-up voltage from contacts 202, causing relay 200 to release and break contacts 208, thereby de-energizing solenoid 56. Tape will start to flow over the heads, and the cycle of the same lesson thus commences again. Because lock-up relay 176 is already engaged (operated), tape will flow into the bin. Tone #2 signal is ignored because the relay 176 is already energized.

Relay 212 is used to allow the tone selective amplifier/rectifier 174 (Tone #2) to operate the "record" relay 182 just once in each cycle of the lesson. The delay relay functions as follows: Whenever the tape is taut, which occurs only once each cycle, microswitch arm 204 closes contacts 214 which energizes relay 212. This relay is a slow-release (delay) type, for example, a slugged relay or provided with condenser 216 to slow its dropout time. When relay 212 operates it closes contacts 218 which provide (through contacts 220 of the record relay 182) a lock-up circuit which is broken when the relay 182 is operated. Contacts 222 of delay relay 212 provide the connection of the tone amplifier 174 to the record relay 182, but the slow drop-out characteristic of the delay relay 212 allows sufficient time for contacts 224 of the record relay 182 to provide a circuit. When the record Tone #2 at 164 ends, both relays 182 and 212 will remain deenergized on the replay of the student's recording. Only at the beginning of the next learning cycle will these relays again become active.

The foregoing describes both manual (selective pushbutton) control of stimulus, response, and confirmation operations in a teaching cycle, and automatic control thereof in various respects, providing a wide degree of choice as to the specific learning process which is to be employed. Various other arrangements of apparatus can of course be employed in the carrying out of these procedures, and it is not intended to limit the invention to the specific arrangements shown and described, except insofar as may be required by the scope of the appended claims.

What is claimed is:

1. In magnetic tape lesson recording and playing apparatus, a record tape, tape supply and take-up mechanisms connected to spaced regions of said tape and normally exerting substantially balanced pulls on opposite ends of a tape portion extending between said mechanisms, a tape drive mechanism selectively engageable with a first part of said tape portion to drive tape in the direction toward said take-up mechanism, by overcoming the pull of said supply mechanism, selectively operating means for inhibiting the pulling action of said take-up mechanism and means for registering the motion of said tape occurring in the direction toward said supply mechanism during any period in which said drive mechanism is disengaged and said inhibiting means is operative.

2. Apparatus in accordance with claim 1, and means for sensing the tautness of said tape portion in the region between said tape drive mechanism and said selectively operating means.

3. Apparatus in accordance with claim 1, including means controlled by signals recorded on said tape for operating said inhibiting means.

4. Apparatus in accordance with claim 1, including means controlled by signals recorded on said tape for controlling the operation of tape recording and reproducing instrumentalities.

5. In an apparatus for aural teaching by the use of a selected sequence of lesson utterances recorded at predetermined intervals on a tape, student response to a lesson utterance, and student response playback, the combination comprising a tape having a lesson track on which a series of spaced lesson utterances are recorded and a separate student response track, supply and take-up reels for said tape, torquing means connected to said reels tending to stretch the tape in a path portion thereof between said reels, recording head means for recording on said student response track a student response to a lesson item, reproducing head means including a first head cooperating with said lesson track for reproducing lesson information and a second head cooperating with said student response track for reproducing student response information recorded on said tape, erasing head means cooperating with said student response track for erasing student response information recorded on said tape, said recording, reproducing and erasing head means being disposed along the path of said tape passing between said reels, first selectively operable means for resisting the winding of said tape onto said take-up reel, second selectively operable means for engaging said tape at a location between said first selectively operable means and said supply reel for driving said tape past said recording, reproducing, and erasing head means, means controlled by signals recorded on said tape for controlling the operation of said second selectively operable means whereby a selected segment of tape between said reels may be repeatedly passed in both directions past said head means without unwinding tape from said take-up reel so that a student may operate said recording head means to record an immediate response to lesson material and then promptly operate said reproducing head means to listen to his recorded response, and metering means responsive to energization of said recording head means for signalling return of the tape to a predetermined point on disengagement of said second selectively operable means.

References Cited

UNITED STATES PATENTS

| | | | |
|---|---|---|---|
| 2,989,594 | 6/1961 | McKaig | 179—100.2 |
| 3,155,778 | 11/1964 | Meyer | 179—100.2 |
| 3,276,707 | 10/1966 | Hurvitz | 242—55.12 |

JAMES W. MOFFITT, Primary Examiner

J. RUSSELL GOUDEAU, Assistant Examiner

U.S. Cl. X.R.

179—100.2; 242—55.12